Dec. 7, 1926.  
S. C. SARETSKY  
AUTOMOBILE  
Filed May 7, 1925  
1,609,312  
2 Sheets-Sheet 1

Witnesses:  
C. E. Wessels.  
B. G. Richards.

Inventor:  
Solomon C. Saretsky,  
By Joshua R H Hook  
his Attorney.

Dec. 7, 1926.                  S. C. SARETSKY                1,609,312
                                 AUTOMOBILE
                              Filed May 7, 1925            2 Sheets-Sheet 2
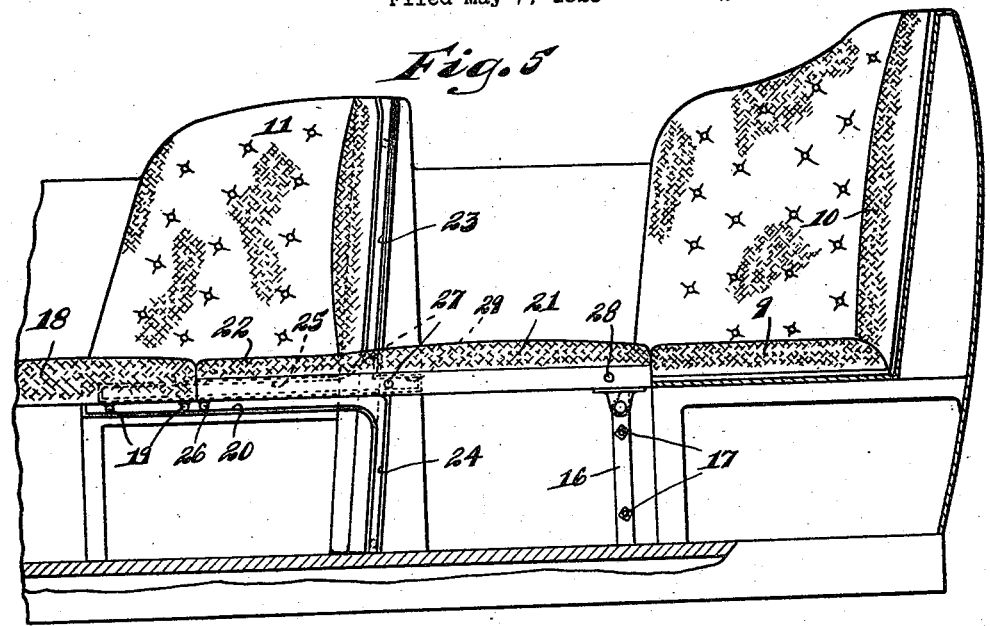
Fig. 5
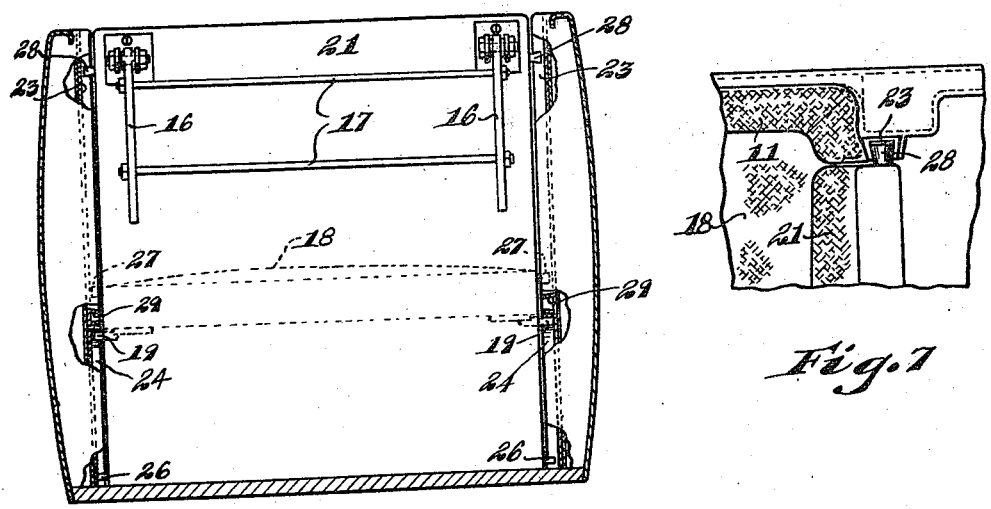
Fig. 6                                                       Fig. 7
Witnesses:                                          Inventor:
C. E. Wessels.                              Solomon C. Saretsky.
B. Y. Richards                              By Joshua R. H. Potts
                                                his Attorney.

Patented Dec. 7, 1926.

1,609,312

UNITED STATES PATENT OFFICE.

SOLOMON C. SARETSKY, OF BENTON HARBOR, MICHIGAN.

AUTOMOBILE.

Application filed May 7, 1925. Serial No. 28,532.

My invention relates to improvements in automobiles and has for its object the provision of a simple, efficient and convenient arrangement of the seats thereof whereby said automobile may be readily converted into a berth.

Other objects will appear hereinafter.

The invention consists in the combinations and arrangements of parts hereinafter described and claimed.

Figure 1:
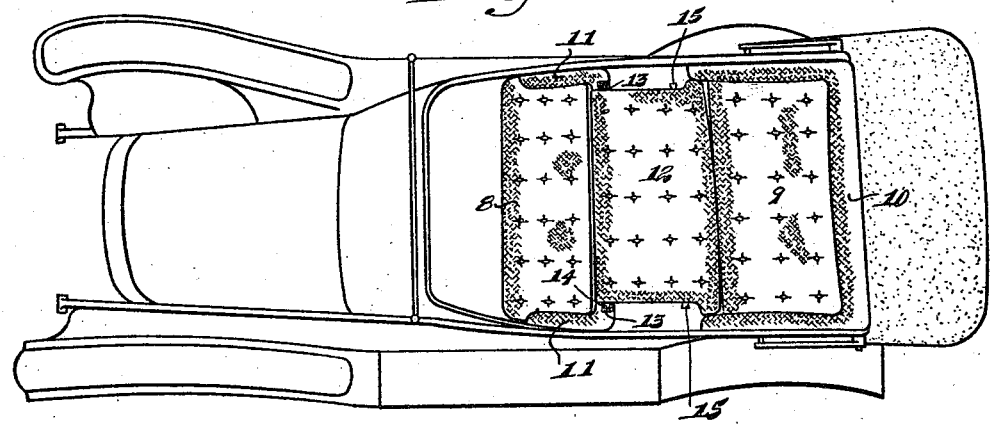
Figure 2:
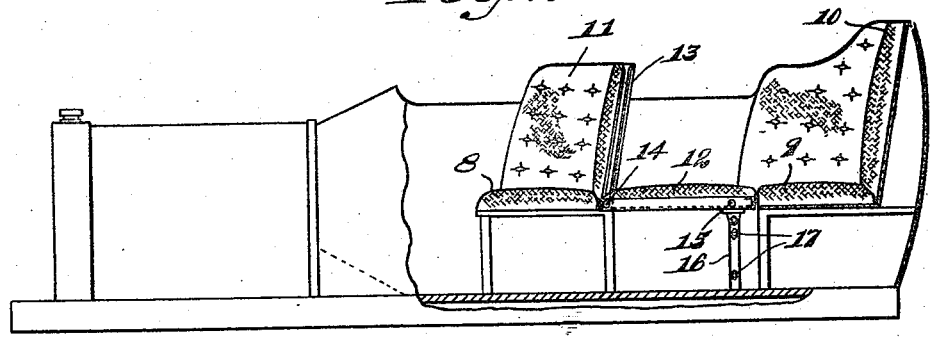
Figure 3:
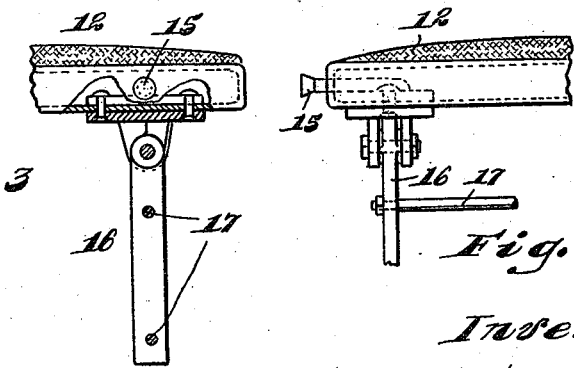
Figure 4:
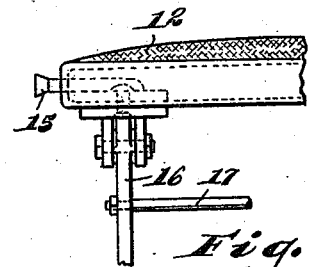

The invention will be best understood by reference to the accompanying drawings, forming a part of this specification, and in which, Fig. 1 is a top plan view of an automobile equipped with the seat arrangement embodying the invention;

Fig. 2 a partial vertical longitudinal section of the same;

Fig. 3 a detail view showing a pivoted supporting leg arrangement employed in the construction;

Fig. 4 a detail view of one side of the back of the front seat;

Fig. 5 a partial vertical longitudinal section of an automobile showing a modified form of construction;

Fig. 6 a rear view of the back of the front seat thereof with portions broken away and shown in section; and Fig. 7 a detail view of one side of the back of the front seat.

The form of construction illustrated in Figs. 1 to 4 inclusive comprises an ordinary automobile construction provided with the usual front seat 8 and rear seat 9, the rear seat 9 being provided with the usual back 10. The front seat is provided with side members 11 and a movably mounted back member 12, said seat members being upholstered as shown. Vertical guide channel members 13 are arranged in the side members 11 opposite each side of the back 12, said channels 13 receiving guide pins or lugs 14 on each side of the lower portion of the back 12 and also guide lugs or pins 15 on each side of the upper portion of the back 12. As will be noted the channels 13 are outwardly flaring in horizontal section and the pins 15 are provided with outwardly flaring heads to fit said channels whereby lateral separation of the pins and channels is prevented but free movement of the pin in the channel is permitted. The back 12 is also provided with a pivoted supporting leg frame 16 having cross rods 17 therein for supporting garments when the seat back is upright. By this arrangement, when it is desired to convert the automobile into a berth all that is necessary is to raise the back 12 of the front seat until the uppermost pins 15 emerge from the tops of the channels 13 whereupon said seat back may be swung rearwardly into registration with the seats 8 and 9 as shown in Fig. 2, thus converting the automobile into a sleeping berth. When it is desired to reconvert the automobile all that is necessary is to swing the back member 12 forwardly and upwardly, raising it sufficiently until the uppermost pins 15 swing over the tops of channels 13 whereupon the seat back is lowered to cause the pins 15 to enter said channels thus securely locking the back in upright position. By this arrangement a simple and efficient construction is provided whereby the automobile may be readily converted into a sleeping berth and reconverted.

In the form of construction illustrated in Figs. 5, 6 and 7 the front seat 18 is provided at opposite sides with guide pins 19 operating in guide channels 20 at each side of the automobile body and whereby the front seat may be slid forwardly when desired. The back 21 of the front seat is provided with a downward extension 22 extending to the floor of the automobile body. Vertical guide channels 23 are arranged at each side of the back 21 and are provided with downward extensions 24 and forward extensions 25. The seat back 21 is provided at each lower side with a guide pin 26 operating in channels 24 and 25, with an intermediate guide pin 27 operating in channels 23 and 25 and with upper guide pins 28 operating in channels 23. The seat is also provided with the supporting leg 16 described above. By this arrangement when it is desired to convert the automobile into a berth the front seat 18 is shifted forwardly and the rear seat raised until the guide pins 28 emerge from the tops of channels 23 and the guide pins 26 are brought into registration with channels 25. In this position the back 21 may be swung rearwardly and pushed forwardly into the position shown in Fig. 5 to convert the entire interior of the automobile into a sleeping berth. Each channel 25 is provided with a short rearward extension 29 into which the corresponding pin 27 is moved when the seat back is depressed, thus locking the seat back in place and facilitating snug fitting between the cushions.

While I have illustrated and described the preferred forms of construction for carrying my invention into effect this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:

An automobile comprising front and rear seats, the front seat being mounted for forward movement; a back for said front seat extending both above and below the same; vertical guide channels at the sides of the back of said front seat and extending both above and below the seat; guide pins on the upper and lower portions of the sides of said back operating in said vertical channels, the lower vertical channel being provided at its top with a forward extension to permit forward movement of the corresponding guide pin therein; intermediate guide pins on said back operating in the upper vertical channels; and rearward extensions at the lower ends of the upper channels to permit rearward movement of said intermediate guide pins therein and whereby the back of said front seat may be first raised then tilted rearwardly to register with said seats and then shifted rearwardly to be locked in said registration, substantially as decribed.

In testimony whereof I have signed my name to this specification.

SOLOMON C. SARETSKY.